(12) United States Patent  (10) Patent No.: US 8,731,730 B2
Watkins et al.  (45) Date of Patent: May 20, 2014

(54) ELECTRIC VEHICLE CLUSTERED CHARGE DISTRIBUTION AND PRIORITIZATION METHOD, SYSTEM AND APPARATUS

(75) Inventors: Timothy M. Watkins, Chicago, IL (US); Mario Landau-Holdsworth, San Francisco, CA (US); Amber Case, Portland, OR (US)

(73) Assignee: EV Patent Holdings, LLC, San Francisco, CA (US)

( * ) Notice: Subject to any disclaimer, the term of this patent is extended or adjusted under 35 U.S.C. 154(b) by 238 days.

(21) Appl. No.: 13/111,798

(22) Filed: May 19, 2011

(65) Prior Publication Data

US 2012/0277927 A1 Nov. 1, 2012

Related U.S. Application Data (60) Provisional application No. 61/479,728, filed on Apr. 27, 2011.

(51) Int. Cl.
  G05D 3/12 (2006.01)
  G05D 5/00 (2006.01)
  G05D 9/00 (2006.01)
  G05D 11/00 (2006.01)
  G05D 17/00 (2006.01)
  H02J 7/00 (2006.01)

(52) U.S. Cl.
  USPC ............................ 700/292; 320/107; 320/109

(58) Field of Classification Search
  USPC .................................. 700/292; 320/107, 109
  See application file for complete search history.

(56) References Cited

U.S. PATENT DOCUMENTS

| | | |
|---|---|---|
| 4,351,013 A | 9/1982 | Matsko et al. |
| 5,631,536 A | 5/1997 | Tseng |
| 5,724,237 A | 3/1998 | Hunter |
| 5,874,823 A | 2/1999 | Suzuki |
| 5,926,004 A | 7/1999 | Henze |
| 6,003,139 A | 12/1999 | McKenzie |
| 6,225,776 B1 | 5/2001 | Chai |
| 6,304,006 B1 | 10/2001 | Jungreis |
| 6,357,011 B2 | 3/2002 | Gilbert |
| 6,842,668 B2 | 1/2005 | Carson et al. |
| 7,256,516 B2 | 8/2007 | Buchanan et al. |
| 7,573,228 B2 | 8/2009 | Karner et al. |
| 7,583,487 B2 | 9/2009 | Chapuis |
| 7,589,498 B2 | 9/2009 | Choy |

(Continued)

OTHER PUBLICATIONS

PCT/US2012/035315, International Search Report and Written Opinion, Nov. 5, 2012.

*Primary Examiner* — Tejal Gami
*Assistant Examiner* — Ziaul Karim
(74) *Attorney, Agent, or Firm* — David A. Crowther (57) ABSTRACT

A method, system, and apparatus include a clustered charge distribution and prioritized charge distribution system for electric vehicles (EVs). Distributed processing units (DPUs) receive member information about an EV or EV user. A power distribution manager (PDM) is coupled to each of the DPUs. The PDM includes a prioritizer. The prioritizer determines a prioritization for charging the EVs based on the member information received by each of the DPUs. A method includes providing clustered charge distribution and charge prioritization for electric vehicles. The method includes sensing whether power is requested by any one of a plurality of EVs within a cluster, generating individual EV-specific information for the EVs using the DPUs, transmitting the EV-specific information to the PDM, and selecting and applying a prioritization algorithm based at least in part on the transmitted information.

15 Claims, 7 Drawing Sheets

(56) References Cited

U.S. PATENT DOCUMENTS

| | | |
|---|---|---|
| 7,646,382 B2 | 1/2010 | Chapuis et al. |
| 7,657,763 B2 | 2/2010 | Nelson et al. |
| 8,013,570 B2 * | 9/2011 | Baxter et al. ............ 320/109 |
| 8,294,420 B2 * | 10/2012 | Kocher ................. 320/109 |
| 8,359,132 B2 * | 1/2013 | Laberteaux et al. ......... 701/22 |
| 2009/0210357 A1 | 8/2009 | Pudar et al. |
| 2010/0114798 A1 | 5/2010 | Sirton |
| 2010/0161481 A1 | 6/2010 | Littrell |
| 2010/0274656 A1 | 10/2010 | Genschel et al. |
| 2012/0153896 A1 * | 6/2012 | Rossi .................. 320/109 |

* cited by examiner

ELECTRIC VEHICLE CLUSTERED CHARGE DISTRIBUTION AND PRIORITIZATION METHOD, SYSTEM AND APPARATUS

CROSS REFERENCE TO RELATED APPLICATION

This application claims the benefit of U.S. Provisional Patent Application Ser. No. 61/479,728, filed Apr. 27, 2011, which is incorporated by reference herein.

TECHNICAL FIELD

This disclosure relates to electric vehicles, and, more particularly, to an apparatus, system, and method for clustered charge distribution and prioritization of charging of electric vehicles.

BACKGROUND

Electric Vehicles (EVs) need to be periodically recharged. This is done by connecting the EV to a charger, which receives its power from an electrical supply line. Plug-in hybrid vehicles also need to be recharged to take advantage of the lower energy costs associated with the established electrical infrastructure. As the adoption rate for these kinds of vehicles (collectively referred to herein as EVs) increases across the globe, users of EVs will have increasing needs for connecting to chargers. The power consumption characteristics of EV chargers are such that when an EV is initially being charged, the EV charger draws substantial power. Conversely, when no EV is connected to the charger, or when an EV is connected but has a "nearly full" charge or a "full" charge, very little or no power is needed by the charger.

The proportion of time the charger is drawing power and charging an EV is, in all cases, less than 100%, and in some cases, can be very low at just a few percent. While chargers can automatically switch off the charging of an EV when the EV is fully charged, the electrical supply line and other location-specific infrastructure are rated to support a generally fixed amount of power (or other related measure such as current), which limits the number of chargers, even if the chargers are not fully being utilized. The requirements of the National Electrical Code (NEC) dictate system design. Systems are designed where all load devices associated with an electrical supply line are simultaneously switched on and all are drawing power at the same time. In other words, designers of such electrical systems plan for a worse-case scenario to ensure that safety conditions and standards are satisfied.

It is conceivable that as EVs are more widely embraced by society at large, multiple chargers will be clustered in a single location, such as an apartment complex or a parking garage. If multiple chargers were to be clustered to meet such charging needs using conventional techniques, the electrical infrastructure required to support such a cluster would be cost prohibitive for the owner of the location in which the cluster is to be installed (e.g., such as the apartment complex or parking garage) because of the large up-front infrastructure investment.

Employing existing technology while maintaining compliance with the NEC limits the size of the cluster to the number of chargers that will draw the maximum line current when all are switched on simultaneously. This, in turn, limits the number of chargers deployable using the existing electrical infrastructure, even though the line load will only infrequently be fully exercised. If more chargers are desired, additional electrical infrastructure must be built out at additional cost and delay, which would impede the acceptance and ramp of EVs into the marketplace.

Moreover, if multiple chargers were carelessly connected to a single electrical supply line, the power demands on the electrical supply line would, in many cases, exceed the maximum line current of the electrical supply line, or otherwise violate safety limits of a supply line breaker associated with the electrical supply line. Such an approach could lead to personal injuries, electrical fires, or other tragedies. Thus, creating such clusters of chargers can be dangerous if done improperly, and is otherwise expensive because it usually means that additional infrastructure must be purchased and installed, including additional supply lines, supply line breakers, safety switches, and the like. This inevitably deters the wider adoption of EVs.

These are only a few of the challenges presented by conventional approaches, which are impeding the wider adoption of electric vehicle technologies, and ultimately hurting efforts for energy independence and environmental responsibility.

Accordingly, a need remains for an improved apparatus, system and method for distributing charges to EVs in a cluster environment. In addition, a need remains for prioritization algorithms for charging the electric vehicles in the cluster environment. Embodiments of the invention address these and other limitations in the prior art.

The foregoing and other features of the invention will become more readily apparent from the following detailed description, which proceeds with reference to the accompanying drawings.

DETAILED DESCRIPTION

Figure 1:
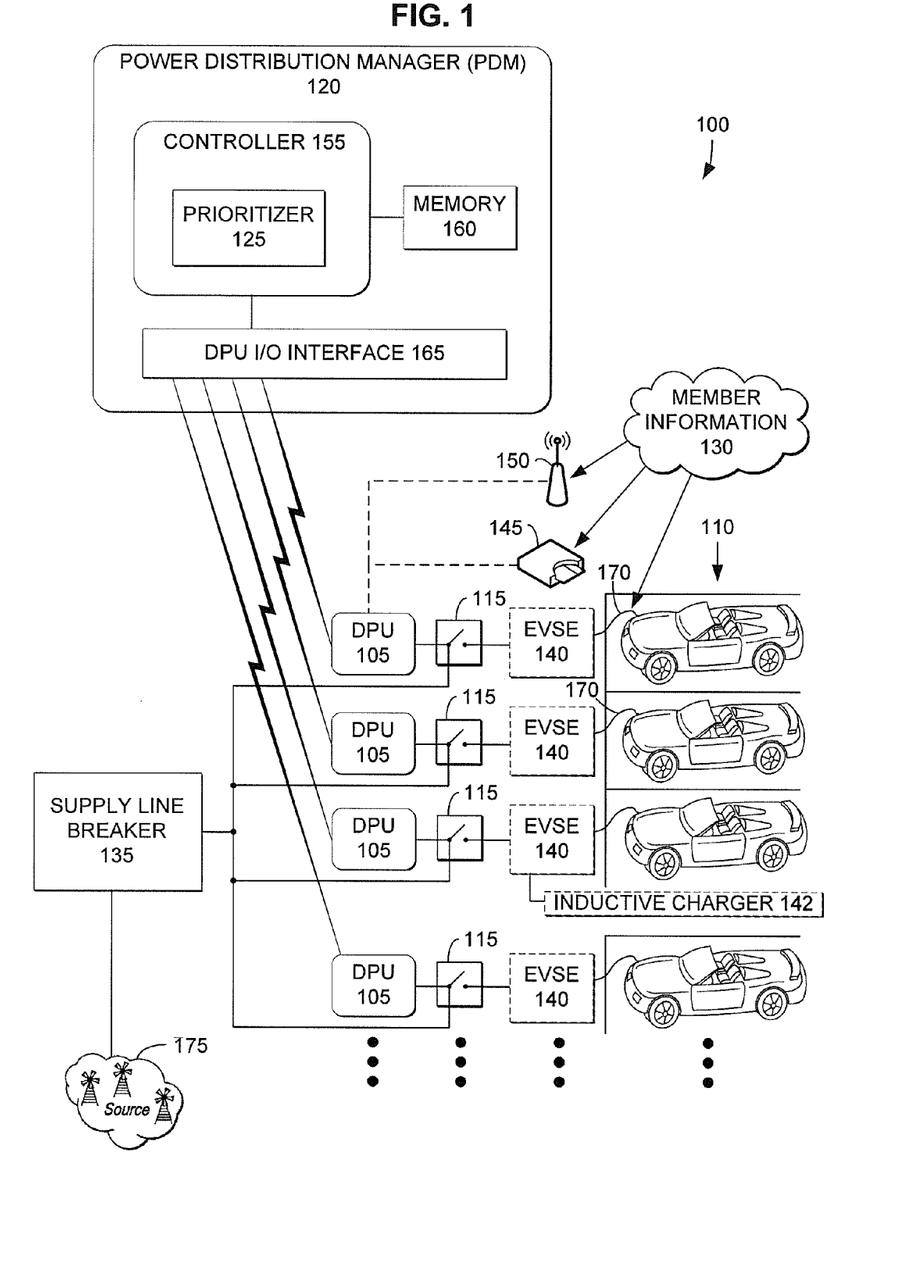
FIG. 1 illustrates an electric vehicle clustered charge distribution system including various components and information related to charging multiple electric vehicles, and prioritizing the charging of multiple electric vehicles, according to an example embodiment of the present invention.

FIG. 1 illustrates an electric vehicle clustered charge distribution system 100. The system 100 includes a variety of components and information related to simultaneously charging multiple electric vehicles 110. While often referred to herein as "electric vehicles" or "EVs," such vehicles can include plug-in hybrid vehicles, pure electric vehicles, or any one of a variety of vehicles that operate or move using at least some electricity.

The system 100 includes, for example, multiple distributed processing units 105. Each distributed processing unit 105, or DPU, can receive member information 130 about a chargeable member such as EV 110 or a user of the EV 110. The term "member information" can refer to information specific to the EV 110 itself, such as battery capacity or rating, real time power usage, charging time left, or the like. Alternatively, or in addition to, the term "member information" can refer to characteristics or attributes of a user of the EV 110, such as whether the user is a paid-up member of an organization or group, whether the user is designated a peak-rate member eligible for drawing charges during peak-rate times, whether the user is a very important person (VIP) having special priority consideration or other privileges, among other possibilities as further described below.

The DPUs 105 are coupled to a power distribution manager 120, referred to herein as PDM 120. The DPUs can be wirelessly coupled to the PDM 120 or connected using a conductor or wire. In some embodiments, particularly for locations having multiple parking levels such as a multistory parking garage, one or more DPUs 105 can be situated on each parking level and wirelessly coupled to the PDM 120, which can be situated on a different parking level or a place remote from the parking levels. In some embodiments, particularly for a single level parking location such as some apartment complexes, the DPUs 105 can be connected to the PDM 120 using a conductor or wired connection.

The PDM 120 includes a controller 155 having a prioritizer 125. The controller 155 can include, for example, a processor and/or software or firmware for controlling the DPUs 105. The prioritizer 125 determines a prioritization for charging the electric vehicles 110 based on the member information 130 received by each of the DPUs 105, as further described in detail below. The PDM 120 can also include a memory 160 for storing information about the EVs 110, the member information 130, prioritization algorithms determined by the prioritizer 125, and the like. The memory can be any suitable non-volatile or volatile memory device or other similar storage device. The PDM 120 also includes an input/output interface 165 for communicating with each of the DPUs 105.

An input device, such as a wireless device 150 and/or a card reader 145, can be coupled to each of the DPUs 105. The wireless device 150 can wirelessly receive the member information 130. The card reader 145 can receive the member information 130 from a card that is readable by the card reader 145. It should be understood that other types of input devices can be used, such as a push button (not shown) or key pad (not shown). The input device can be located remotely from the DPU 105, remotely from the PDM 120, proximate or attached to the DPU 105, proximate or attached to the PDM 120, proximate or attached to a charger for the EV 110 or other electric vehicle supply equipment, and/or proximate to a parking space for the EV 110. Each input device can receive the member information 130 for a corresponding EV or EV user.

In some embodiments, a single input device (e.g., 150 or 145) can be used to receive the member information 130 from one or more EVs or EV users. In cases where a single input device is used, the single input device can be coupled either to one of the DPUs 105 or directly to the PDM 120. In some embodiments, the member information 130 is transmitted over the charging cord 170 itself, through an electric vehicle supply equipment unit 140, and then to the DPU 105 and/or PDM 120. In some embodiments, particularly for systems having multiple parking levels such as a multistory parking garage, one or more input devices such as 150 and/or 145 can be situated on each parking level. The member information 130 is ultimately received by the PDM 120, regardless of the number and placement of the input devices 150 and/or 145, and then used by the prioritizer 125 to determine a prioritization of charge distribution.

Electrical contactors 115 are coupled to and controlled by each of the DPUs 105. One or more of the DPUs 105 are selectively activated or signaled by the PDM 120 to begin charging. In some embodiments, a subset of the DPUs 105 is activated by the PDM 120 based on the prioritization for charging the EVs 110. In response to such activation or signaling by the PDM 120, the selected DPUs cause the associated electrical contactor 115 to permit charging of the associated EV 110. Electricity is then permitted to flow from the source 175 to the associated EV 110 through the supply line breaker 135.

The system 100 can optionally include electric vehicle supply equipment (EVSE) units 140, sometimes referred to as chargers. EVSE units 140 can supply electric charging at higher voltages and currents than are available from a typical electric socket outlet. Each of the EVSE units 140 can be coupled to a corresponding one of the electrical contactors 115. A charging cord 170 can be coupled to each of the EVSE units 140. Each of the charging cords 170 can be coupled to one of the EVs 110. Alternatively, an inductive charger 142 can be coupled to or otherwise associated with one or more of the EVSE units and can inductively charge the EV 110.

It should be understood that EVSE units 140 need not be used, and the charging cord 170 and/or the inductive charger 142 can be coupled directly to the electric contactor 115 and/or directly to the DPU 105. The DPUs 105 are configured to control the amount of charge transferred between the supply line breaker 135 and the EVSE units 140, and/or between the supply line breaker 135 and the EVs 110. The DPUs 105 are also configured to control when charge is transferred between the supply line breaker 135 and the EVSE units 140, and/or between the supply line breaker 135 and the EVs 110.

Figure 2:
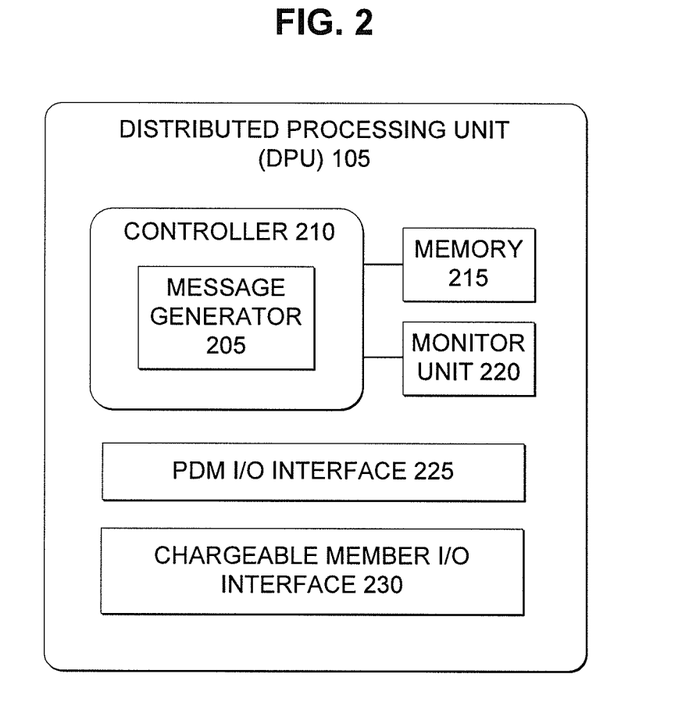
FIG. 2 illustrates a distributed processing unit component of the system illustrated in FIG. 1.
Figure 3:
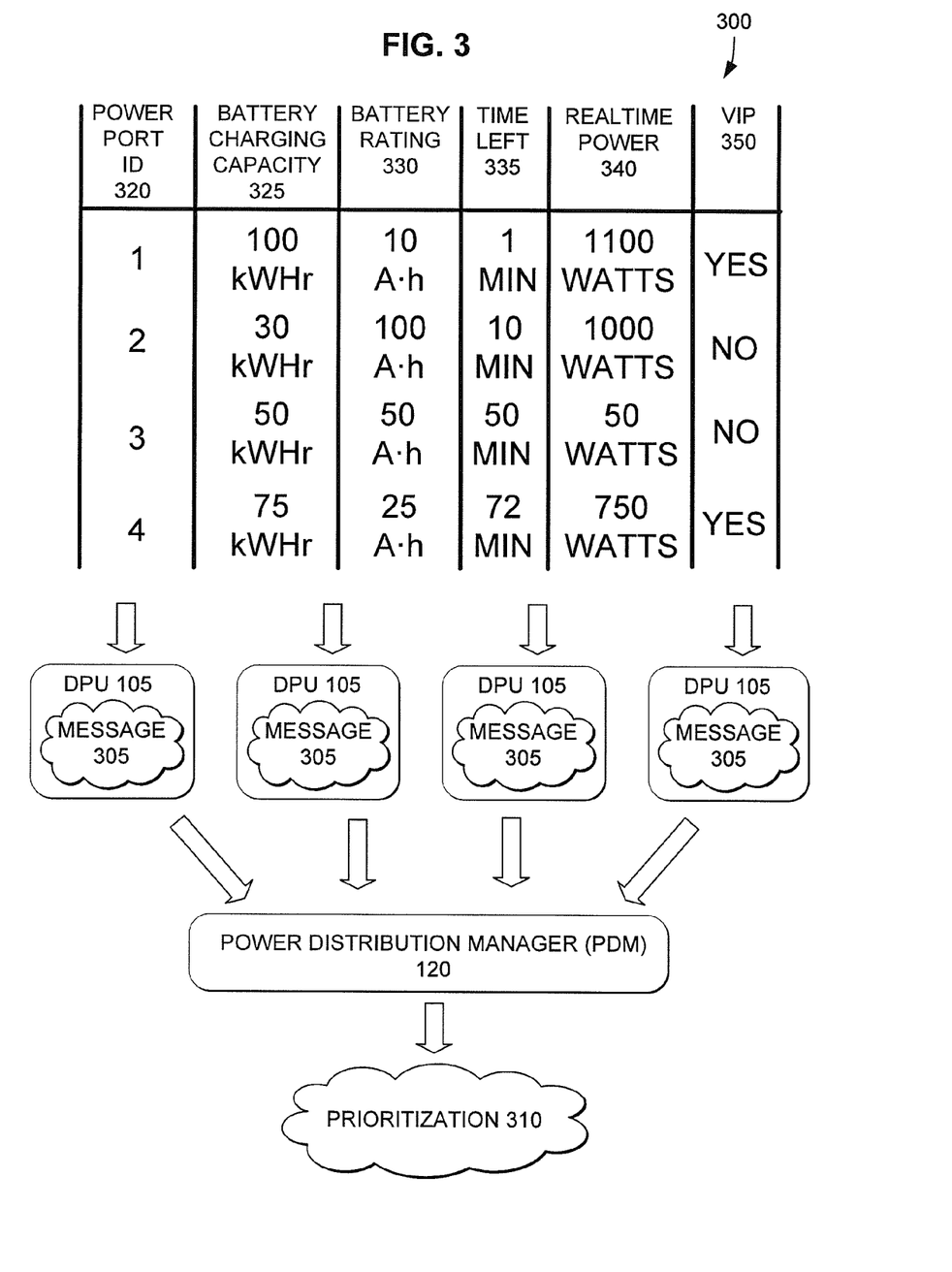
FIG. 3 illustrates a table of information about power ports and electric vehicle members of the system illustrated in FIG. 1, including the assembly of EV-specific information by a power distribution manager and the prioritization thereof, according to example embodiments of the invention.

FIG. 2 illustrates a distributed processing unit (DPU) 105 component of the system illustrated in FIG. 1. FIG. 3 illustrates table 300 of information about power ports and electric vehicle members of the system illustrated in FIG. 1, including the assembly of EV-specific information by a power distribution manager and the prioritization thereof, according to example embodiments of the invention. Reference is now made to FIGS. 2 and 3.

The DPU 105 includes a controller 210 to control a charge flow between the supply line breaker 135 and the EVs 110 responsive to the PDM 120. A message generator 205 is associated with or otherwise included in each of the DPUs 105. The message generator 205 generates individual EV-specific messages 305 based on the member information 130 received about the EVs 110 and/or EV users. As mentioned above, the DPU 105 can receive the member information 130 from the EV 110 or EV user through, for example, the wireless device 150, the card reader 145, the inductive charger 142, and/or through the power cord 170. After receiving the member information 130, the message generator 205 generates an individual message including a collection of data about the corresponding EV 110 and/or EV user.

The member information 130 can be transmitted a single time or periodically (e.g., during charging of the EV 110) to the DPU 105. The member information 130 can include information about the EV 110 such as battery charging capacity 325 of one or more batteries associated with the EV 110, battery rating 330 for one or more batteries associated with the EV 110, real time power usage 340 of one or more batteries associated with the EV 110, time left 335 for fully charging one or more batteries associated with the EV 110, the power port ID 320 to which the power cord 170 of the EV 110 is attached, the arrival or attachment time of the power cord 170 to the power port ID 320, the arrival time of the EV 110 as sensed by the inductive charger 142, the percentage (%) of kWHr delivered so far to the EV 110, the time elapsed since a particular EV 110 began to receive a charge, whether the EV 110 is approaching the end of its charge, an amount of power requested by the EV 110, among other suitable information related to the EV 110.

The member information 130 can also include information about a user of the EV 110 such as whether the user is a paid-up member or a delinquent member of an organization or group, whether the user is designated a peak-rate member eligible for drawing charges during electricity peak-rate times or an off-peak rate member eligible for drawing charges only during off-peak rate times, whether the user is a very important person (VIP) 350 having special priority consideration or other privileges, whether a particular priority is requested by the user, whether a particular power request is submitted by the user, among other suitable characteristics or attributes of the user of the EV 110.

The DPUs 105 receive the member information 130 associated with one or more EVs 110 or one or more users of the EVs 110. The DPUs 105 can generate individual EV-specific messages 305 using the message generator 205. The DPUs 105 can also include a monitor unit 220 to monitor requests for additional power received from the EVs 110 and/or the EVSEs 140. The requests for power can be monitored directly relative to the power being drawn over the power cord 170 or another connection between the EVSEs 140 and the DPUs 105. In other words, the requests for power can be recognized by the DPUs 105 by measuring the input and/or output power levels.

The monitor unit 220 can monitor the requests for power indirectly such as through a separate communication interface between the EV 110 and the DPU 105 (not shown), and/or a separate communication interface between the EVSE 104 and the DPU (not shown). The monitor unit 220 can also monitor for information similar to the member information 130 discussed above, either directly or indirectly relative to the EV 110 and/or the EVSE 140 using the separate communication interface.

The message generator 205 can generate the individual EV-specific messages 305 based at least on the member information 130 and/or the information gathered by the monitor unit 220. After producing the individual messages 305, the DPUs 115 transmit the individual messages 305 to the PDM 120 for further processing. Each individual EV-specific message 305 includes a collection of data that is specific to the EV 110 and/or the user of the EV 110, which taken together, provides useful information to the PDM 120 for selecting a particular prioritization algorithm and prioritizing the charging of the EVs 110 in accordance with the algorithm.

Each DPU 105 can also include a memory 215 coupled to the controller 210. The memory 215 can store a prioritization 310 determined by the prioritizer 125 of the PDM 120. The memory can be any suitable non-volatile or volatile memory device or other similar storage device. Each DPU 105 can include a first input/output interface 225 for communicating with the PDM 120 and a second input/output interface 230 for communicating with the input device such as the wireless input device 150 and/or the card reader 145. The second input/output interface 230 can receive the member information 130. The monitor unit 220 can also receive information about power requests, etc., using the input/output interface 230.

The PDM 120 receives the individual EV-specific messages 305 from one or more of the DPUs 105. The prioritizer 125 of the PDM 120 determines the prioritization 310 based on the collection of information contained within the individual messages 305, as described in further detail below.

Figure 4:
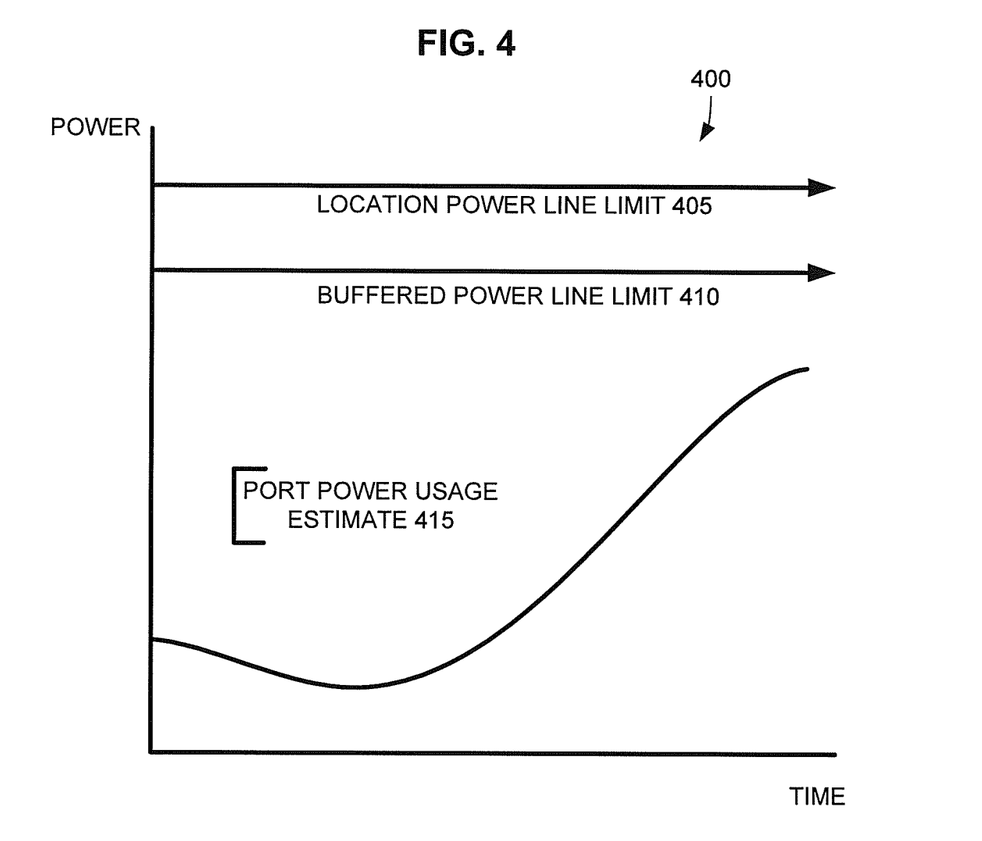
FIG. 4 illustrates a graph of power versus time, including a location power line limit and a buffered power line limit, according to example embodiments of the invention.

FIG. 4 illustrates a graph 400 of power versus time, including a location power line limit 405 and a buffered power line limit 410, according to example embodiments of the invention. Generally, a particular location has associated therewith a power line limit 405, or in other words, the total amount of power that can be drawn at a given time over the power line that provides power to the particular location. It should be understood that the line limit 405 can also be represented by other values including current, voltage, and/or time. The location will have other power equipment suitable for use with the power line, such as one or more supply line breakers 135 (of FIG. 1). The one or more supply line breakers 135 can have the power line limit 405 associated therewith so that if the power line limit 405 is exceeded in any way, the supply line breakers 135 can disconnect or otherwise interfere with the flow of charge so that dangerous electrical situations or accidents are avoided.

The PDM 120 can calculate or otherwise determine a buffered power line limit 410. Alternatively, the PDM 120 can receive from an operator of the system 100 an appropriate buffered power line limit 410. The buffered power line limit 410 is less than the location power line limit 405 so that a safety margin is built into the system 100, which further reduces the chances of ever exceeding the location power line limit 405, and also increases the safety of the system 100.

In some embodiments of the present invention, the location power line limit 405 and/or the buffered power line limit 410 are less than the total power that can be drawn by the EVs 110 during charging. In other words, in the absence of the prioritization techniques as disclosed herein, both the location power line limit 405 and the buffered power line limit 410 would be exceeded because the system 100 is designed to charge significantly more EVs 110 than would otherwise be permitted using conventional technologies.

Using the embodiment of the invention disclosed herein, however, neither the location power line limit 405 nor the buffered power line limit 410 are exceeded, even though significantly more EVs 110 are attached to the system 100 and simultaneously requesting power than would otherwise be permitted. The PDM 120 and/or the individual DPUs 105 can determine a power port usage estimate 415 based on information included within the individual messages 305. Knowing the power port usage estimate 415 allows the PDM 120 to accurately prioritize the charging of the EVs 110 while satisfying NEC standards. In other words, the prioritizer 125 of the PDM 120 prioritizes the charging of the EVs 110 so that the location power line limit 405 and/or the buffered power line limit 410 are not exceeded.

Figure 5:
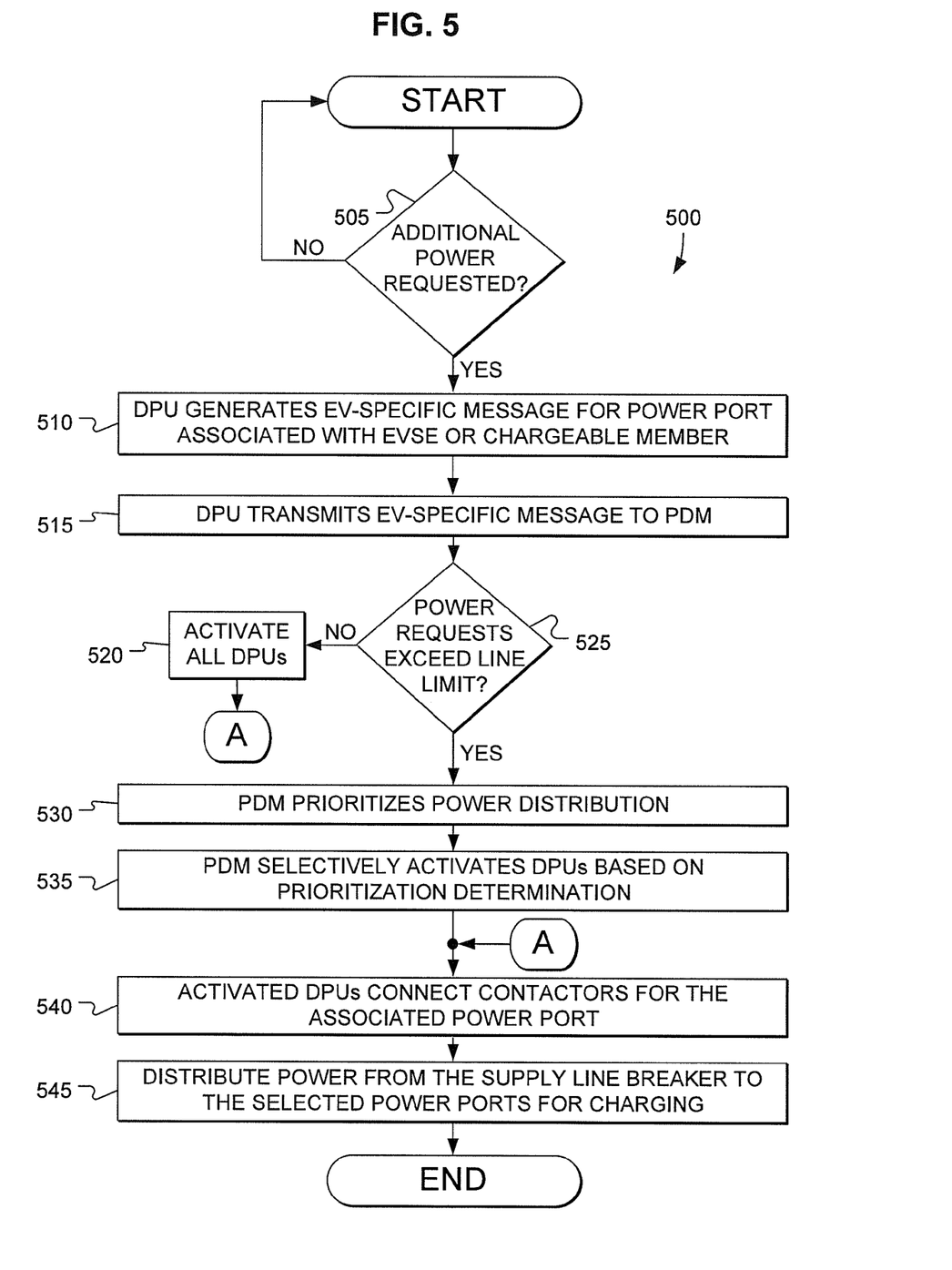
FIG. 5 illustrates a flow diagram including techniques for gathering EV-specific information from distributed processing units and prioritizing power distribution using a power distribution manager, according to example embodiments of the invention.

FIG. 5 illustrates a flow diagram 500 including techniques for gathering EV-specific information 305 from DPUs 105 and prioritizing power distribution using the PDM 120, according to example embodiments of the invention.

The technique begins at 505 by sensing whether any power, or any additional power, is requested by any one of a plurality of N electric vehicles 110 with a cluster of vehicles 110. At 510, each DPU 105 generates an individual EV-specific message 305 for a particular power port associated with the EVSE 104 and/or the EV 110. For instance, a first EV-specific message 305 can be generated, using a first DPU 105, for a first EV 110. The first message can be associated with a first power port connected to the first EV 110. Similarly, a second EV-specific message 305 can be generated, using a second DPU 105, for a second EV 110. The second message can be associated with a second power port connected to the second EV 110. Moreover, an Nth EV-specific message 305 can be generated, using an Nth DPU 105, for an Nth EV 110. The Nth message can be associated with an Nth power port connected to the Nth EV 110.

At 515, the first, second, and Nth messages 305 are transmitted from the first, second, and Nth DPU 105, respectively, to the PDM 120. At 525, the PDM 120 can determine whether power requested by the first, second, and Nth EVs 110 exceeds a location power line limit 405 and/or a buffered power line limit 410. If NO, meaning all of the EVs 110 connected to the system 100 would not exceed the 405 and/or 410 line limit, then the flow proceeds to 520 where all of the DPUs 150 are activated so that all of the EVs 110 desiring a charge receives one. In other words, the first, second, and Nth DPUs 105 are activated so that all of the first, second, and Nth EVs 110 receive a charge. The flow then goes through bubble A, thereby skipping the prioritization steps.

Otherwise, if YES, meaning the power requested exceeds the line limit 405 and/or 410, then the flow proceeds to 530, where the PDM 120 prioritizes the power distribution. More specifically, the PDM 120 compares the collection of data within the first, second, and Nth messages 305 and determines a prioritization 310 based on the collected data. At 535, the PDM 120 selectively activates a subset of the first, second, and Nth DPUs 105 based on the prioritization 310.

The flow then proceeds to 540, where the activated DPUs 105 cause the electrical contactors 115 associated with the activated DPUs 105 to connect, thereby causing a charge to flow. As a result, at 545, power is distributed from the supply line breaker 135 to the subset of the first, second, and Nth EVs 110 based on the prioritization 310.

Figure 6A:
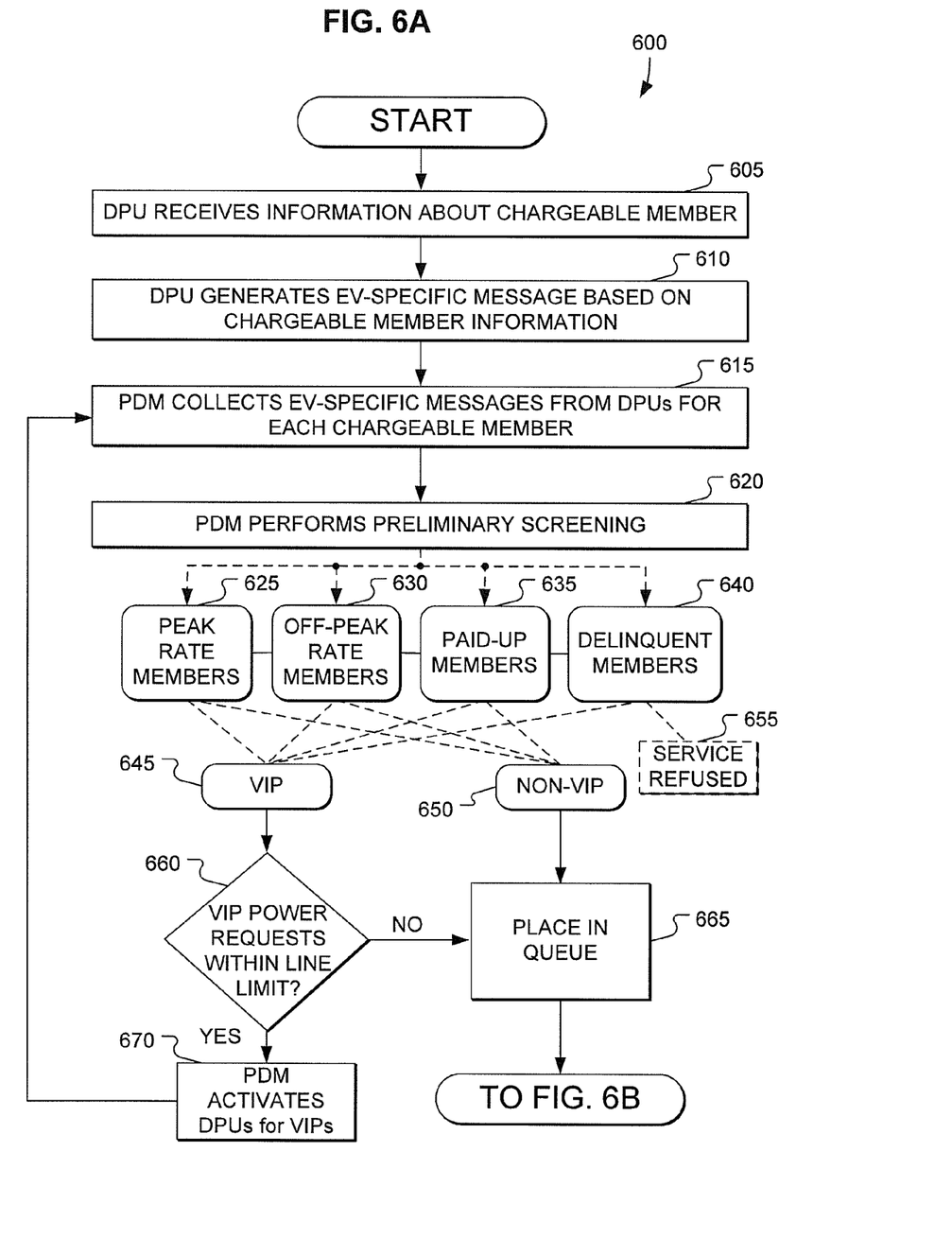
FIGS. 6A-6B illustrate a flow diagram including techniques for distributing charges in a clustered charge environment to a group of electric vehicles, including the prioritization of charging of the group of electric vehicles, according to example embodiments of the invention.
Figure 6B:
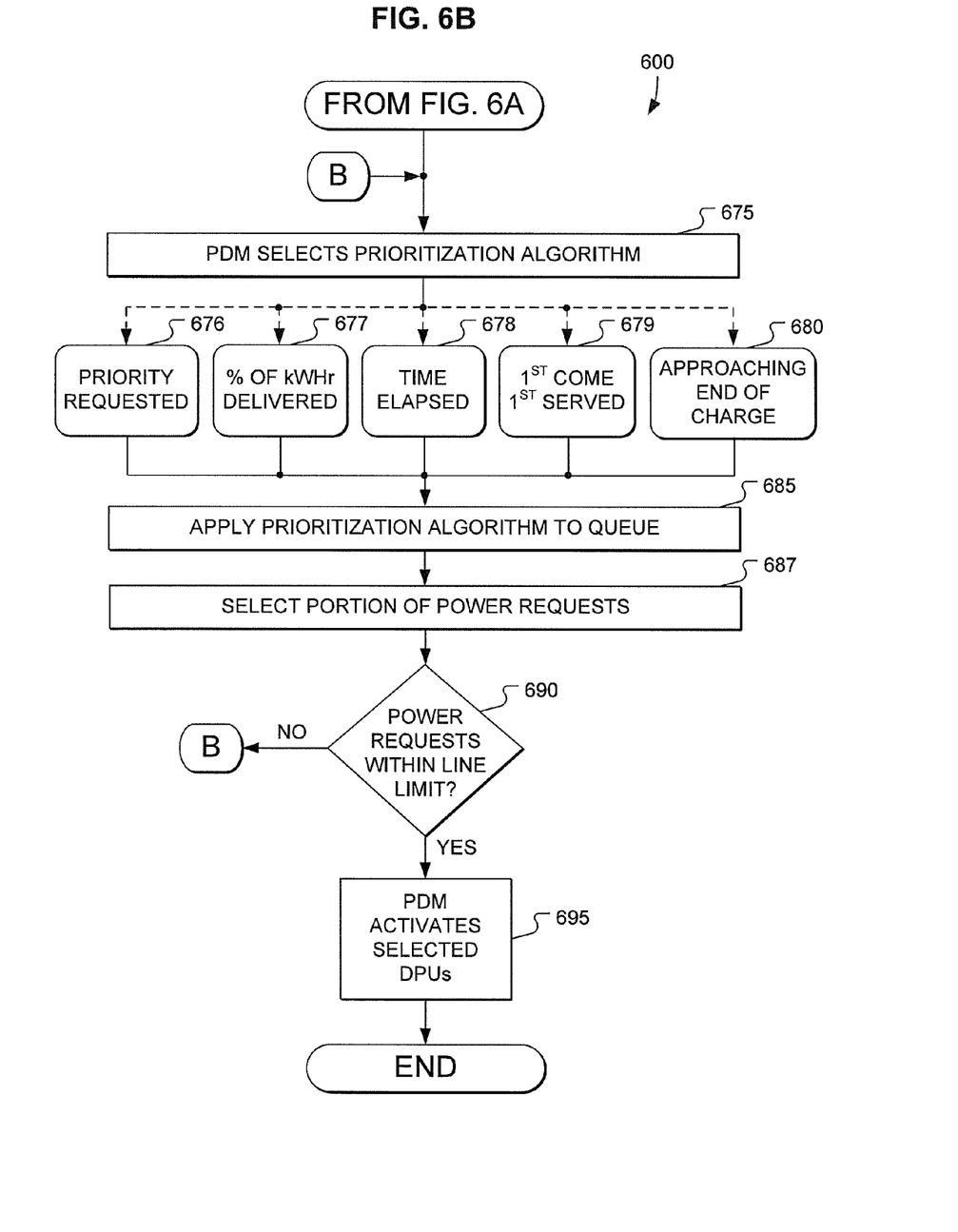

FIGS. 6A-6B illustrate a flow diagram 600 including techniques for distributing charges in a clustered charge environment to a group of EVs 110, including the prioritization of charging of the group of EVs 110, according to example embodiments of the invention. Reference is now made to FIGS. 6A and 6B.

In some embodiments, techniques include providing clustered charge distribution and charge prioritization for EVs 110. Specifically, for this embodiment, the process begins at 605 where the DPU 105 receives information about a chargeable member such as the EV 110. The information can include, for example, the member information 130 described above. In some embodiments, the member information 130 about the EVs 110 is received at a plurality of DPUs 105.

At 610, each DPU 105 generates an EV-specific message 305 based at least on the member information 130 received for each EV 110. The PDM 120 then collects, at 615, the message 305 from each of the DPUs 105. After the individual messages 305 have been collected, the PDM 120 performs a preliminary screening of the EVs 110 and/or users of the EVs 110 based on the collection of data within the messages 305.

The preliminary screening 620 can include, for example, determining that a user of the EV 110 is a delinquent member 640 of a group or organization associated with the system 100. And if so, such user can be excluded or refused charging service at 655. If, however, the user is a paid-up member 635, then charging service is not refused on that basis. When it is determined that a user of the EV 110 is an off-peak rate preference member at 630, then charging service can be excluded for such a member during peak-rate electricity times. Conversely, when it is determined that a user of the EV 110 is a peak rate preference member, then charging service is not excluded for such a member during peak-rate times.

The preliminary screening 620 can further include separating users by VIP status. For instance, of the remaining users not yet excluded from charging service, the messages 305 associated with the remaining users can be parsed by the PDM 120 to determine whether users of the electric vehicles are VIPs or not, and divided into a VIP group 645 and a non-VIP group 650. For users of the EVs 110 determined not to be VIPs, any power requests for these non-VIPs can be added to a queue at 665. Otherwise, for the users of the EVs 110 determined to be VIPs, the aggregate power requests from the VIPs can be checked or otherwise verified to fall within the location power line limit 405 and/or the buffered power line limit 410.

When it is determined at 660 that the requests from the VIPs are within the location power line limit 405 and/or buffered power line limit 410, the DPUs 105 associated with the EVs 110 of the VIPs can be activated so that the EVs 110 for the VIPs are charged at 670, after which the PDM 120 again collects EV-specific information from the DPUs at 615. Otherwise, when it is determined that the requests from the VIPs are not within the location power line limit 405 and/or the buffered power line limit 410, at least some or all of the power requests from said VIPs are added to the queue. Indeed, all of the remaining power requests from said VIPs and/or non-VIPs can be added to the queue at 665.

The flow then proceeds to FIG. 6B, where the PDM 120 selects a prioritization algorithm at 675. More specifically, the prioritizer 125 (of FIG. 1) is configured to determine the prioritization 310 (of FIG. 3) based on at least one of or all of (a) a priority requested 676 by a user of a particular electric vehicle, (b) a percentage of kWHr 677 delivered so far to a particular EV 110, (c) time elapsed 678 since a particular EV 110 began to receive a charge, (d) a first come first served order 679 in which a particular EV 110 is given a higher priority based on its start or arrival time, and (e) whether a particular electric vehicle is approaching the end of its charge 680. Furthermore, the prioritization algorithm can take into account other factors such as parking spot location, i.e., whether a particular parking spot is closest to a door, whether the user is willing to pay a premium rate, and so forth.

Applying the prioritization algorithm to requests in the queue at 685 can include: prioritizing at 676 based on a priority requested by a user, prioritizing at 677 based on a percentage of kWHr delivered so far to a particular EV 110, prioritizing at 678 based on time elapsed since a particular EV 110 began to receive a charge, prioritizing at 679 based on a first come first served order in which a particular EV 110 is given a higher priority based on its start or arrival time, and prioritizing at 680 based on a whether a particular EV 110 is approaching the end of its charge. Other suitable factors described herein can be used when applying the prioritization algorithm.

At 687, a portion of the power requests are selected by the PDM 120 from the queue based on the prioritization algorithm used. The flow then proceeds to 690 where a determination is made whether the selected portion of the power requests is within the location power line limit 405 and/or the buffered location power line limit 410. If NO, the flow goes through bubble B to 675 where the PDM 120 can select a different prioritization algorithm or revise the prioritization algorithm accordingly. Otherwise, if YES, the flow proceeds to 695 where the PDM 120 selectively activates DPUs 105 associated with the portion of power requests selected as a result of the application of the prioritization algorithm. Thus, a subset of the DPUs 105 can be selectively activated based at least on the preliminary screening and the prioritization algorithm.

Other embodiments may provide for alternate configurations, which carryout similar objectives to the preferred embodiments. These can include, for example, safety features in which the PDM 120 signals one or more DPUs 105 to shut off or otherwise enter a "safe mode" if the PDM 120 detects that the line limits 405 and/or 410 have been exceeded. Moreover, if a predefined amount of time lapses or the DPUs 105 cannot communicate with the PDM 120 for a predefined amount of time, the DPUs 105 can automatically shut off or otherwise enter the safe mode, thereby adding yet another layer of protection and safety.

Embodiments of the present invention manage the power from the supply line to the charger cluster. The system can distribute power to those chargers and/or EVs that require or request it until the line load limits are approached. The system can deny access to other chargers and/or EVs calling for power until one of the currently powered chargers and/or EVs completes its charging task, and shuts down or is otherwise disconnected from the system. The PDM 120 can time slot manage the power according to a time slot algorithm in which each EV 110 receives a charge for a period of time. The length of the period of time can be determined, at least in part, based on the prioritization of the charging as described above.

In some embodiments, the PDM 120 permits charging access to all EVs, but causes the power delivered to each EV to be reduced by a predefined amount so that any given or all chargers do not exceed the line limits. In a further manifestation, the PDM 120 permits charge to flow through all chargers, but instructs the chargers to limit the power they draw such that the total line limits are not exceeded.

The PDM 120 can also cause charging to automatically take place during off-peak times and/or other specially priced power conditions. The clustered charging system, as described herein, can be implemented or otherwise used in private residential environments where multiple EVs are in the same garage and use a common electrical supply line. Alternatively, the system can be deployed in publicly accessible locations such as airport parking lots, public garages, libraries, movie theaters, and the like. The clustered charging system can be used in apartment complexes or parking garage type environments where the electrical supply line might supply a floor or a sector of a floor. Indeed, any place having some finite quantity of power and the desire to charge multiple EVs that would otherwise exceed the power line limits of the location, can benefit by the features and advantages of the embodiments of the present invention. The number of chargers in the cluster and the number of DPUs in the cluster, etc., can be increased and the desired charging power delivered without adding additional electrical supply infrastructure.

Furthermore, embodiments of the invention may include a method by which modularized components provide flexibility across a variety of communication systems and charging infrastructure, and allow users and station owners, apartment complex owners, garage owners, and the like, to implement a clustered charge distribution and charge prioritization system as a relatively discrete system, or alternatively, in combination with other charge station capabilities and EVSEs.

Although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

The invention claimed is:
1. A method for providing clustered charge distribution and charge prioritization for electric vehicles, the method comprising:
 receiving member information about electric vehicles at a plurality of distributed processing units;

each distributed processing unit generating a message based on the member information received for each electric vehicle;

collecting, using a power distribution manager, the message from each of the distributed processing units;

performing, using the power distribution manager, a preliminary screening of the electric vehicles based on the messages;

selecting, using the power distribution manager, a prioritization algorithm based on the messages;

selectively activating a subset of the distributed processing units based at least on the preliminary screening and the prioritization algorithm;

wherein performing the preliminary screening includes:
parsing each message to determine whether users of the electric vehicles are paid-up or delinquent members; and parsing each message to determine whether users of the electric vehicles are peak-rate preference members or off-peak rate preference members;

when it is determined that a user of the electric vehicle is a delinquent member, excluding charging service to said user;

when it is determined that a user of the electric vehicle is an off-peak rate preference member, excluding charging service to said user during peak-rate times;

when it is determined that a user of the electric vehicle is a peak rate preference member, not excluding charging service to said user during peak-rate times;

of the remaining users not yet excluded from charging service, parsing the associated remaining messages to determine whether users of the electric vehicles are VIPs or not;

for the users of the electric vehicles determined not to be VIPs, adding power requests for said non-VIPs to a queue;

for the users of the electric vehicles determined to be VIPs, checking whether power requests from the VIPs are within a location power line limit;

when it is determined that the requests from the VIPs are within the location power line limit, activating the distributed processing units associated with the electric vehicles of the VIPs so that said electric vehicles for the VIPs are charged; and when it is determined that the requests from the VIPs are not within the location power line limit, adding at least some power requests from said VIPs to the queue.

2. The method of claim 1, further comprising:
selecting, using the power distribution manager, a prioritization algorithm;
applying the prioritization algorithm to the power requests on the queue;
selecting a portion of the power requests from the queue based on the applied prioritization algorithm;
determining whether the portion of the power requests is within the location power line limit; and
when the portion of the power requests is within the location power line limit, activating the distributed processing units associated with said portion of power requests.

3. The method of claim 2, wherein applying the prioritization algorithm includes at least one of:
prioritizing based on a priority requested by a user;
prioritizing based on a percentage of kWHr delivered so far to a particular electric vehicle;
prioritizing based on time elapsed since a particular electric vehicle began to receive a charge;
prioritizing based on a first come first served order in which a particular electric vehicle is given a higher priority based on its start or arrival time; and
prioritizing based on whether a particular electric vehicle is approaching the end of its charge.

4. The method of claim 1, further comprising:
selecting, using the power distribution manager, a prioritization algorithm; and applying the prioritization algorithm to the power requests on the queue.

5. The method of claim 4, wherein applying the prioritization algorithm includes at least one of:
prioritizing based on a priority requested by a user;
prioritizing based on a percentage of kWHr delivered so far to a particular electric vehicle;
prioritizing based on time elapsed since a particular electric vehicle began to receive a charge;
prioritizing based on a first come first served order in which a particular electric vehicle is given a higher priority based on its start or arrival time; and
prioritizing based on whether a particular electric vehicle is approaching the end of its charge.

6. The method of claim 4, wherein applying the prioritization algorithm includes all of:
prioritizing based on a priority requested by a user;
prioritizing based on a percentage of kWHr delivered so far to a particular electric vehicle;
prioritizing based on time elapsed since a particular electric vehicle began to receive a charge;
prioritizing based on a first come first served order in which a particular electric vehicle is given a higher priority based on its start or arrival time; and
prioritizing based on whether a particular electric vehicle is approaching the end of its charge.

7. The method of claim 1, wherein:
checking whether the power requests from the VIPs are within the location power line limit includes checking whether the power requests from the VIPs are within a buffered power line limit, wherein the buffered power line limit includes a safety margin built therein;
in response to determining that the power requests from the VIPs are within the buffered power line limit, activating the distributed processing units associated with the electric vehicles of the VIPs so that said electric vehicles for the VIPs are charged.

8. The method of claim 1, wherein parsing the associated remaining messages to determine whether users of the electric vehicles are VIPs or not further comprises:
dividing users of the electric vehicles into a VIP group and a non-VIP group;
for the users of the electric vehicles determined to be part of the non-VIP group, adding power requests for said non-VIPs to the queue; and
for the users of the electric vehicles determined to be part of the VIP group, checking whether power requests from the VIPs are within the location power line limit.

9. The method of claim 1, wherein the selectively activated subset of the distributed processing units includes two or more distributed processing units.

10. The method of claim 1, wherein selectively activating further comprises:
receiving an activation signal, by the subset of the distributed processing units, from the power distribution manager;
closing, by each of the distributed processing units within the subset, a corresponding electrical contactor switch from among a plurality of electrical contactor switches; and causing electricity to flow from an external source to a corresponding separate vehicle charger unit from among a plurality of separate vehicle charger units, and from the corresponding separate vehicle charger unit to a corresponding electric vehicle.

11. A method for providing clustered charge distribution and charge prioritization for electric vehicles, the method comprising:
  receiving member information about electric vehicles at a plurality of distributed processing units;
  each distributed processing unit generating a message based on the member information received for each electric vehicle;
  collecting, using a power distribution manager, the message from each of the distributed processing units;
  performing, using the power distribution manager, a preliminary screening of the electric vehicles based on the messages;
  selecting, using the power distribution manager, a prioritization algorithm based on the messages;
  selectively activating a subset of the distributed processing units based at least on the preliminary screening and the prioritization algorithm;
  wherein performing the preliminary screening includes:
    parsing each message to determine whether users of the electric vehicles are paid-up or delinquent members; and
    parsing each message to determine whether users of the electric vehicles are peak-rate preference members or off-peak rate preference members;
  when it is determined that a user of the electric vehicle is a delinquent member, excluding charging service to said user;
  when it is determined that a user of the electric vehicle is an off-peak rate preference member, excluding charging service to said user during peak-rate times;
  when it is determined that a user of the electric vehicle is a peak rate preference member, not excluding charging service to said user during peak-rate times;
  of the remaining users not yet excluded from charging service, parsing the associated remaining messages to determine whether users of the electric vehicles are VIPs or not;
  for the users of the electric vehicles determined not to be VIPs, adding power requests for said non-VIPs to a queue;
  for the users of the electric vehicles determined to be VIPs, checking whether power requests from the VIPs are within a location power line limit;
  when it is determined that the requests from the VIPs are within the location power line limit, activating the distributed processing units associated with the electric vehicles of the VIPs so that said electric vehicles for the VIPs are charged;
  when it is determined that the requests from the VIPs are not within the location power line limit, adding at least some power requests from said VIPs to the queue;
  selecting, using the power distribution manager, a prioritization algorithm;
  applying the prioritization algorithm to the power requests on the queue;
  selecting a portion of the power requests from the queue based on the applied prioritization algorithm;
  determining whether the portion of the power requests is within the location power line limit; and
  when the portion of the power requests is within the location power line limit, activating the distributed processing units associated with said portion of power requests;
  wherein applying the prioritization algorithm includes all of:
    prioritizing based on a priority requested by a user;
    prioritizing based on a percentage of kWHr delivered so far to a particular electric vehicle;
    prioritizing based on time elapsed since a particular electric vehicle began to receive a charge;
    prioritizing based on a first come first served order in which a particular electric vehicle is given a higher priority based on its start or arrival time; and
    prioritizing based on whether a particular electric vehicle is approaching the end of its charge.

12. The method of claim 11, wherein:
  checking whether the power requests from the VIPs are within the location power line limit includes checking whether the power requests from the VIPs are within a buffered power line limit, wherein the buffered power line limit includes a safety margin built therein;
  in response to determining that the power requests from the VIPs are within the buffered power line limit, activating the distributed processing units associated with the electric vehicles of the VIPs so that said electric vehicles for the VIPs are charged.

13. The method of claim 11, wherein parsing the associated remaining messages to determine whether users of the electric vehicles are VIPs or not further comprises:
  dividing users of the electric vehicles into a VIP group and a non-VIP group;
  for the users of the electric vehicles determined to be part of the non-VIP group, adding power requests for said non-VIPs to the queue; and
  for the users of the electric vehicles determined to be part of the VIP group, checking whether power requests from the VIPs are within the location power line limit.

14. The method of claim 11, wherein the selectively activated subset of the distributed processing units includes two or more distributed processing units.

15. The method of claim 11 wherein selectively activating further comprises:
  receiving an activation signal, by the subset of the distributed processing units, from the power distribution manager;
  closing, by each of the distributed processing units within the subset, a corresponding electrical contactor switch from among a plurality of electrical contactor switches; and
  causing electricity to flow from an external source to a corresponding separate vehicle charger unit from among a plurality of separate vehicle charger units, and from the corresponding separate vehicle charger unit to a corresponding electric vehicle.

* * * * *